(12) United States Patent
Bachmaier et al.

(10) Patent No.: US 9,197,125 B2
(45) Date of Patent: Nov. 24, 2015

(54) METHOD FOR LIMITING STARTUP CURRENTS IN AN INVERTER CIRCUIT

(71) Applicant: Siemens Aktiengesellschaft, München (DE)

(72) Inventors: Georg Bachmaier, München (DE); Christian Bachmann, München (DE); Dominik Bergmann, Sachsenkam (DE); Matthias Gerlich, München (DE); Mirjam Mantel, München (DE); Guillaume Pais, München (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 282 days.

(21) Appl. No.: 13/869,518

(22) Filed: Apr. 24, 2013

(65) Prior Publication Data

US 2013/0286695 A1 Oct. 31, 2013

(30) Foreign Application Priority Data

Apr. 25, 2012 (DE) .......................... 10 2012 206 839

(51) Int. Cl.
*H02M 1/36* (2007.01)
*H02M 7/12* (2006.01)
(52) U.S. Cl.
CPC ................ *H02M 1/36* (2013.01); *H02M 7/125* (2013.01)

(58) Field of Classification Search
CPC ........................... H02M 7/5375; H02M 7/797
USPC .......................... 363/49, 78, 89, 98, 127, 132
See application file for complete search history.

(56) References Cited

U.S. PATENT DOCUMENTS

| | | | | |
|---|---|---|---|---|
| 3,848,175 | A * | 11/1974 | Demarest | 363/49 |
| 4,447,867 | A * | 5/1984 | Evans et al. | 363/56.04 |
| 6,654,262 | B2 * | 11/2003 | Hussein et al. | 363/49 |
| 2013/0286695 | A1 * | 10/2013 | Bachmaier et al. | 363/49 |

OTHER PUBLICATIONS

Malinowski, M.; Sensorless Control Strategies for Three-Phase PWM Rectifiers, Warsaw University of Technology, Warsaw 2001; http://www.isep.pw.edu.pl/icg/pdf/phd/mariusz_malinowski.pdf.

(Continued)

*Primary Examiner* — Jeffrey Sterrett
(74) *Attorney, Agent, or Firm* — Henry M. Feiereisen LLC

(57) ABSTRACT

Damage to an inverter due to an excessively high start-up current, when using space vector control without a voltage sensor in conjunction with small connection inductances, can be prevented with a method for controlling the inverter, and with a corresponding controller, wherein the controller is configured to transmit in a start-up phase of an inverter circuit a control signal to a control input of the inverter circuit, wherein the control signal simultaneously switches three first semiconductor switches, which are connected to a first DC voltage terminal of the inverter circuit, temporarily into a conducting state.

7 Claims, 6 Drawing Sheets

(56) References Cited

OTHER PUBLICATIONS

Dongsheng Li, Notohara,; Y. Ando, T."Sensorless control for a three-phase PWM rectifter-inverter system with single-chip microcontroller", Electrical Machines and Systems, 2009. ICEMS 2009, International Conference on Systems; Computing & Processing (Hardware/Software) ; Power, Energy & Industry Applications; Robotics & Control Systems, Digital Object Identifier,2009, pp. 1-6.

Hyunjae Yoe, Kim J.-H.; Seung-Ki Sul ,"Sensorless Operation of a PWM Rectifier for a Distributed Generation" Power Electronics, IEEE Transactions,vol. 22 , Issue: 3, Photonics & Electro-Optics ; Digital Object Identifier, 2007, pp. 1014-1018.

* cited by examiner

—— Estimate
---- Actual

——— Estimate
---- Actual

METHOD FOR LIMITING STARTUP CURRENTS IN AN INVERTER CIRCUIT

CROSS-REFERENCES TO RELATED APPLICATIONS

This application claims the priority of German Patent Application, Serial No. 10 2012 206 839.2, filed Apr. 25, 2012, pursuant to 35 U.S.C. 119(a)-(d), the content of which is incorporated herein by reference in its entirety as when fully set forth herein.

BACKGROUND OF THE INVENTION

The present invention relates to a controller for an inverter circuit. The invention also relates to an inverter with an inverter circuit. The invention further relates to a method for operating an inverter.

Voltage-controlled inverters without voltage sensors on the AC side of the inverter are known in the art. Current control is hereby carried out by using fictitious direct current values in a Cartesian d-q-co-ordinate system of the rotor of a fictitious direct current motor, which in the control schematic represents an AC side circuit of the inverter. Eliminating voltage sensors on the AC side has cost advantages, but also the disadvantage that excessively high currents (overload currents) occur during the start-up of an inverter with small inductances, which may exceed the load limits of components, due to the fact that during start-up with small inductances, the starting currents can rise so rapidly that they are not correctly or not sufficiently accurately measured.

It would therefore be desirable and advantageous to obviate prior art shortcomings and to provide an improved controller for an inverter circuit and to provide an inverter, with which, respectively, the occurrence of excessively high currents during start-up of the inverter circuit can be avoided, even when only small inductances are used on the AC side of the inverter. It would also be desirable to provide a method for operating an inverter having these advantageous features.

SUMMARY OF THE INVENTION

According to one aspect of the present invention, a controller for an inverter circuit provides a start-up function for placing the inverter circuit into operation, wherein the controller is configured to transmit in a start-up phase of the inverter circuit a control signal to a control input of the inverter circuit, wherein the control signal simultaneously switches three first semiconductor switches, which are connected to a first DC voltage terminal of the inverter circuit, temporarily into a conducting state.

According to another aspect of the present invention, an inverter includes the aforedescribed controller according to the present invention.

According to another aspect of the present invention, a method for operating an inverter according to the present invention includes switching second semiconductor switches, which are connected to a second DC voltage terminal of the inverter, into a blocking state; applying an at least three-phase AC voltage to an at least three-phase AC voltage terminal of the inverter; simultaneously switching three first semiconductor switches, which are connected to a first DC voltage terminal of the inverter, into a conducting state; measuring a magnitude of a current flowing across the at least three-phase AC voltage terminal during a predetermined time period; switching the first semiconductor switches into a blocking state after the predetermined time period; calculating a correction factor from a magnitude of a current measured immediately after the predetermined time period and from a magnitude of the current calculated from an estimated line voltage for the predetermined time period; determining a phase angle of the AC voltage to be applied, by taking into account the magnitude of the current measured immediately before or immediately after the predetermined time period and the calculated correction factor; and using the determined phase angle as a start value for calculating pulse-width-modulation signals of the inverter.

The short-term switching through of the semiconductor switches for a brief time period during a start-up of the inverter makes it possible to measure a magnitude of currents, the ratio of which is a measure of an actual mains side phase angle. By means of this measure, a phase angle of a space vector modulation of the inverter can be adjusted at an early stage to the actual mains-side phase angle, and the occurrence of an excessively high start-up current can be avoided. This is useful in particular when using space vector control without voltage sensors, thus advantageously eliminating voltage sensors.

In order to avoid a DC voltage side short-circuit, both semiconductor switches (i.e. the first and the second semiconductor switches) of an inverter branch are usually initially switched to non-pass (i.e. blocked), before one of the two semiconductor switches of the inverter branch is switched to the pass (i.e. conducting) state, wherein the other of the two semiconductor switches of the inverter branch is switched to non-pass for as long as the other one of the two semiconductor switches is switched to pass. However, this is not absolutely essential when no voltage is yet applied to the voltage side, or when a DC-voltage-side short-circuit can be temporarily tolerated for some other reason. As a rule, however, it is necessary for the controller to be prepared such that, during the switching to pass of the first semiconductor switches, the second semiconductor switches which are connected to a second DC voltage terminal of the DC voltage terminal of the inverter circuit remain at non-pass. As a result, the situation is reached that a DC voltage side short-circuit is avoided when the phase lines are short-circuited on the AC voltage side. Accordingly, a start-up of the inverter is possible when, on the DC voltage side of the inverter, a charged and therefore live energy store (typically a charged capacitor and/or a charged battery) is located.

According to an advantageous feature of the present invention, the correction factor may be two-dimensional. When the correction factor not only provides information about the phase angle of the mains voltage, i.e. is not only one-dimensional but two-dimensional, then the space vector modulation can not only be adjusted to a phase position of a mains voltage, but also to a mains side voltage amplitude.

According to another advantageous feature of the present invention, in the step of detecting the current magnitudes, one current magnitude each may be detected at at least two phases of the inverter. The other values which are required for a space vector controller of the inverter may be determined from the actual current magnitudes of at least two phases by the method described in the introduction.

According to another advantageous feature of the present invention, in the step of calculating the pulse width modulation signals, a space vector may be calculated for the stator of a virtual motor connected to the AC voltage side. The method according to the invention can the also be used in conjunction with the proven space vector modulation.

According to another advantageous feature of the present invention, the method may include a step in which, for the calculation of the pulse width modulation signals, a space vector is calculated for the rotor of a virtual motor connected to the AC voltage side. The method according to the invention can then be used in conjunction with the proven space vector modulation, and the inverter can be controlled using rotor-related values, which are low-frequency compared to corresponding stator-related values, making processing significantly less complex and error-prone than with the corresponding stator-related values.

According to another advantageous feature of the present invention, the method may include a step in which an amplitude of the applied AC voltage is calculated by taking into account the current magnitude measured after the predetermined time period and the correction factor. The start-up behavior of the inverter can then be adapted to different mains voltages, to different load characteristics and/or to fluctuations in the inductance values.

According to yet another advantageous feature of the present invention, the method may include a step in which a frequency of the applied AC voltage is calculated by taking into account the current magnitude measured after the predetermined time period and the correction factor. The inverter can thereby be readily adapted to a line frequency.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
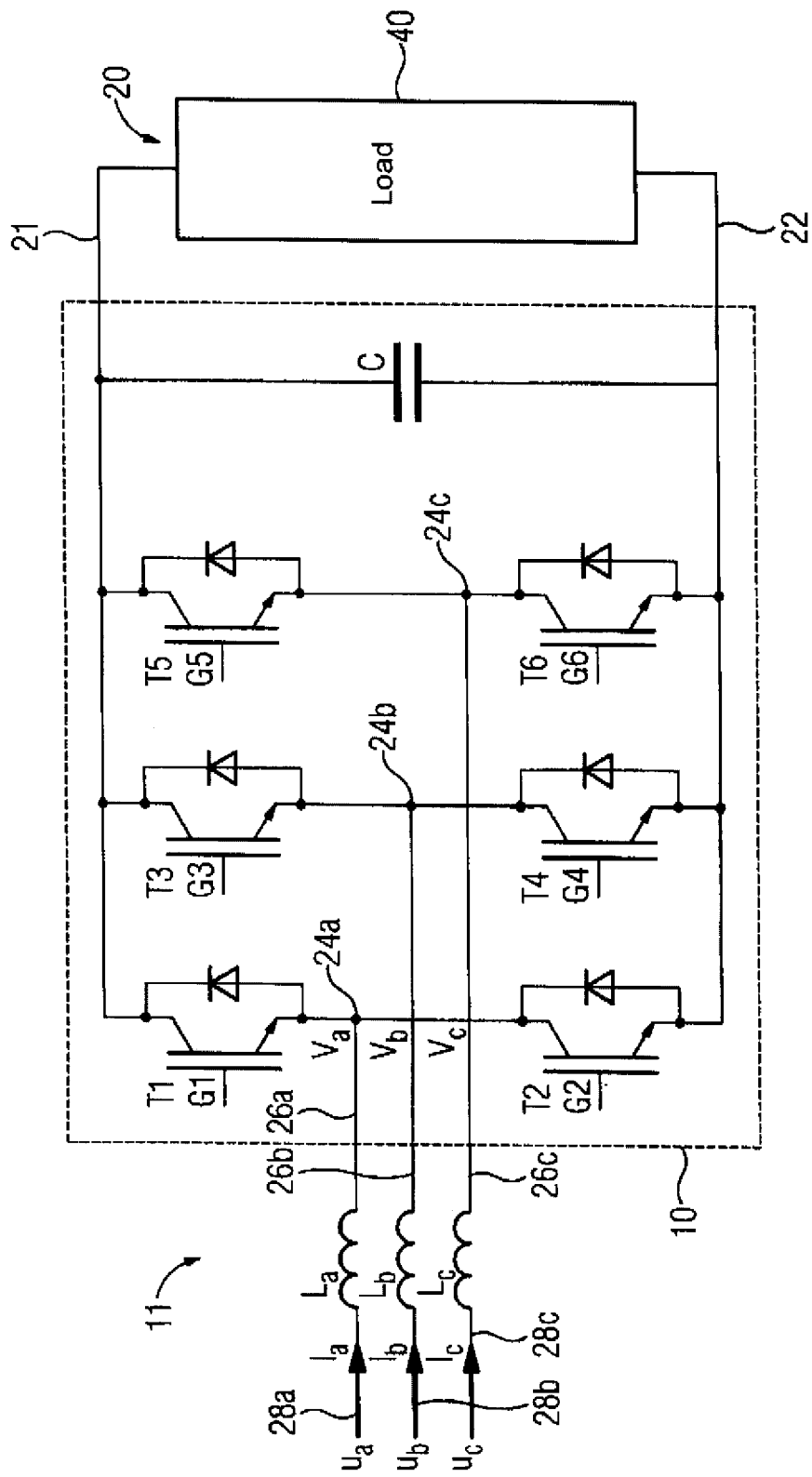
FIG. 1 shows a schematic block diagram of a conventional inverter circuit, with a battery and connection inductances connected thereto.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown an inverter circuit 10 having a DC voltage side 20 with a first 21 and a second 22 DC voltage terminal. Furthermore, a capacitor C is typically connected between the DC voltage terminals 21, 22, in order to reduce DC voltage fluctuations caused by switching processes.

A series circuit of a first semiconductor switch T1, T3, T5 and a second semiconductor switch T2, T4, T6 is provided for each phase a, b, c. The semiconductor switches T1, T2, T3, T4, T5, T6 are power transistors (for example N-MOSFET or IGBT) with free-wheeling diodes connected in parallel. A corresponding tap 24a, 24b, 24c is located between the two semiconductor switches of each phase a, b, c. Each of the taps 24a, 24b, 24c is connected at a corresponding phase line 26a, 26b, 26c to a voltage source via an inductance La, Lb, Lc providing phase voltages Ua, Ub, Uc. The inductance La, Lb, Lc can be a parasitic inductance of the respective phase line 26a, 26b, 26c. Hereinafter it is assumed that the inductance value L of the inductances La, Lb, Lc is the same. The inverter 10 comprises a controller 30 (see FIG. 2), which is prepared such as to actuate the semiconductor switches T1, T2, T3, T4, T5, T6 by way of its gate connections G1, G2, G3, G4, G5, G6 with pulse width modulation signals Sa, Sb, Sc.

Figure 2:
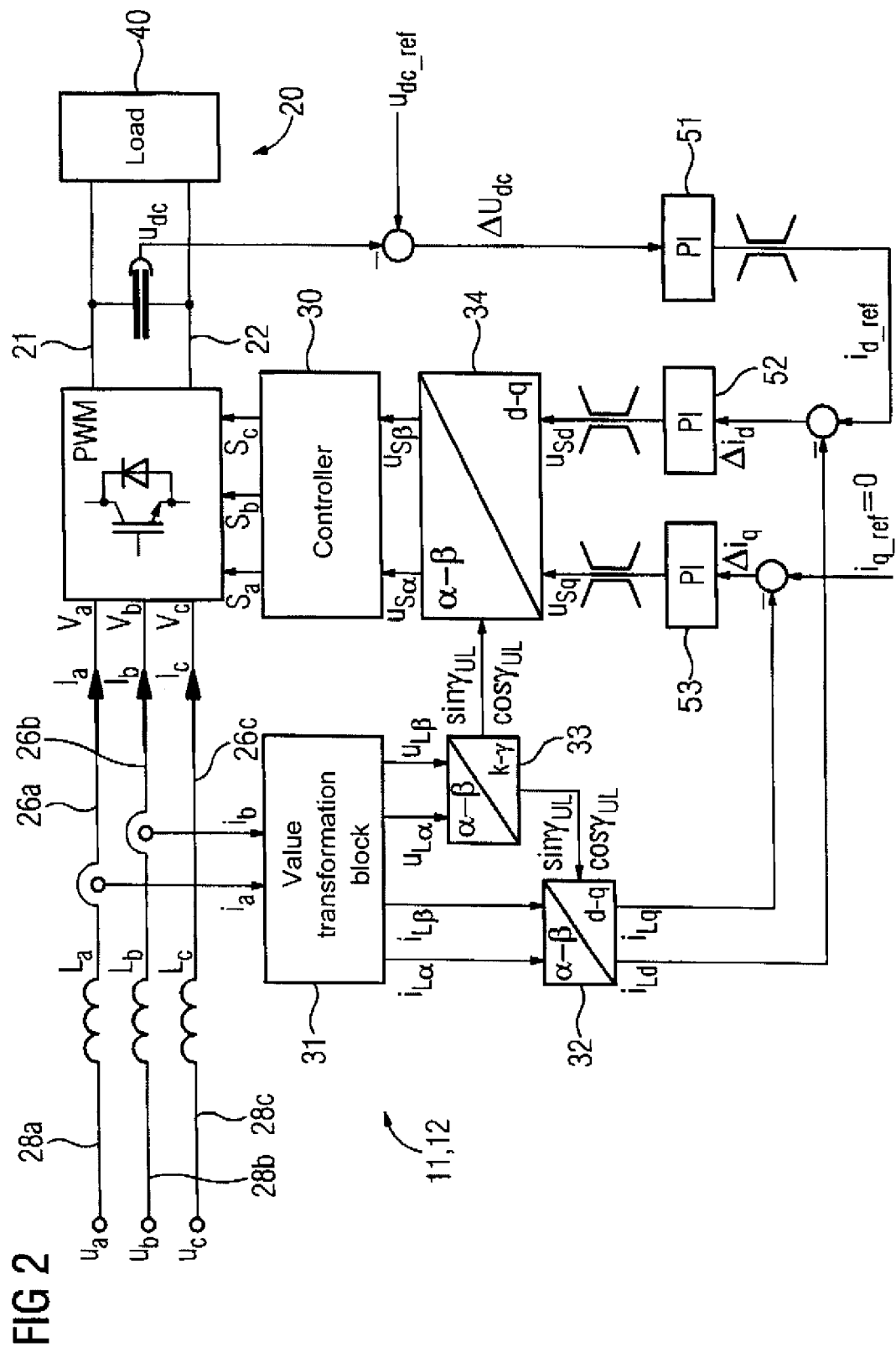
FIG. 2 shows a schematic block diagram of controlling an inverter without voltage sensors.

In normal operation, the phase lines 26a, 26b, 26c are connected by way of their inductances La, Lb, Lc to a three-phase voltage source, which has several phase lines 28a, 28b, 28c. In addition, an electrical load 40 (for example, a battery) is connected in normal operation between the DC voltage terminals 21, 22 and in parallel to the capacitor C. The inverter 11, for example a PFC inverter (PFC=power factor correction), is used, for example, to charge a high-voltage battery (800 V). The inverter 11, as FIG. 1 and FIG. 2 show, can typically also be operated in an energy recovery direction, wherein the device 40 then at least temporarily takes on the role of an energy source.

The block diagram shown in FIG. 2 for a voltage-related control without voltage sensors schematic has been described in the prior art, and is known to a person skilled in the art, so that only the points addressing the present invention need to be discussed in the following.

A first value transformation block 31 is configured for the determination of Cartesian current values iLα, iLβ and of voltage values uLα, uLβ at the inductances La, Lb, Lc, which can be interpreted as stator windings of a virtual (i.e. imaginary) motor.

A second value transformation block 32 is configured for the determination of Cartesian current values iLd, iLq of the rotor of the virtual motor.

A third value transformation block 33 is configured for the determination of sine and cosine of the estimated phase $\gamma_{UL}$ of the phase voltages $U_L$. The first proportional-integral controller 51 produces, as a manipulated variable, a reference current value id_ref. The second proportional-integral controller 52 produces, as a manipulated variable, a first component uSd of a rotor-related voltage phasor uSd, uSq. The third proportional-integral controller 53 produces, as a manipulated variable, a second component uSq of the rotor-related voltage phasor uSd, uSq.

The fourth value transformation block 34 produces, from the rotor-related voltage phasor uSd, uSq, by taking into account sine and cosine of the estimated phase $\gamma_{UL}$ of the phase voltages $U_L$, a stator-related voltage phasor uSα, uSβ (space vector).

The controller 30 (which forms a fifth value transformation block) produces from the stator-related voltage phasor uSα, uSβ pulse width modulation signals Sa, Sb, Sc for the actuation of the semiconductor switches T1, T2, T3, T4, T5, T6.

In order to reduce the number of voltage sensors, the AC voltage values uLα, uLβ required for control are determined in the value transformation block 31 by means of back calculation from the following values: Current magnitudes ia, ib, ic of the currents (which are measured on the phase lines 26a, 26b, 26c), and known inductance values L of the connection inductances.

When the inductance value L of the connection inductances La, Lb, Lc is small, the estimation of the AC voltage values uLα, uLβ during the run-up of the inverter 11 is still very imprecise. Accordingly, during the run-up of the inverter 11, the known regulation may permit currents Ia, Ib, Ic which can damage the inverter circuit 10.

When, for example, the following applies:
Ua is the voltage on the line a,
ûa is the estimated voltage on the line a,
ia is the magnitude of the phase current on the line a,
va, vb, vc are the voltages applied to the inverter circuit 10 (inverter voltages).

The initial conditions at t0 can be as follows:
Ua(t0)=325 V,
ia(t0)=0 A,
ûa(t0)=0 V.

In order to attain an initial current of 0 A, the line voltages Ua, Ub, Uc must agree with the inverter voltages va, vb, vc: va(t0)=ûa(t0)=0 V.

Because the estimate ûa, ûb, ûc of the line voltage Ua, Ub, Uc is erroneous, it is assumed that the voltage $U_L$=Ua−va=325 V. For further parameters, the following values are assumed: Inductance value: L=200 pH, control period: Ts=128 µs. From Δi=(Ua−va)*Ts/L it follows, for the values given in the example, that the current rises to 208 A up to the end of a single control period. With the usual space vector modulation, therefore, it is not possible without further ado for the system to be started up without a high initial current. With the prior art, larger inductances are used, which avoid too high an initial current.

Figure 3:
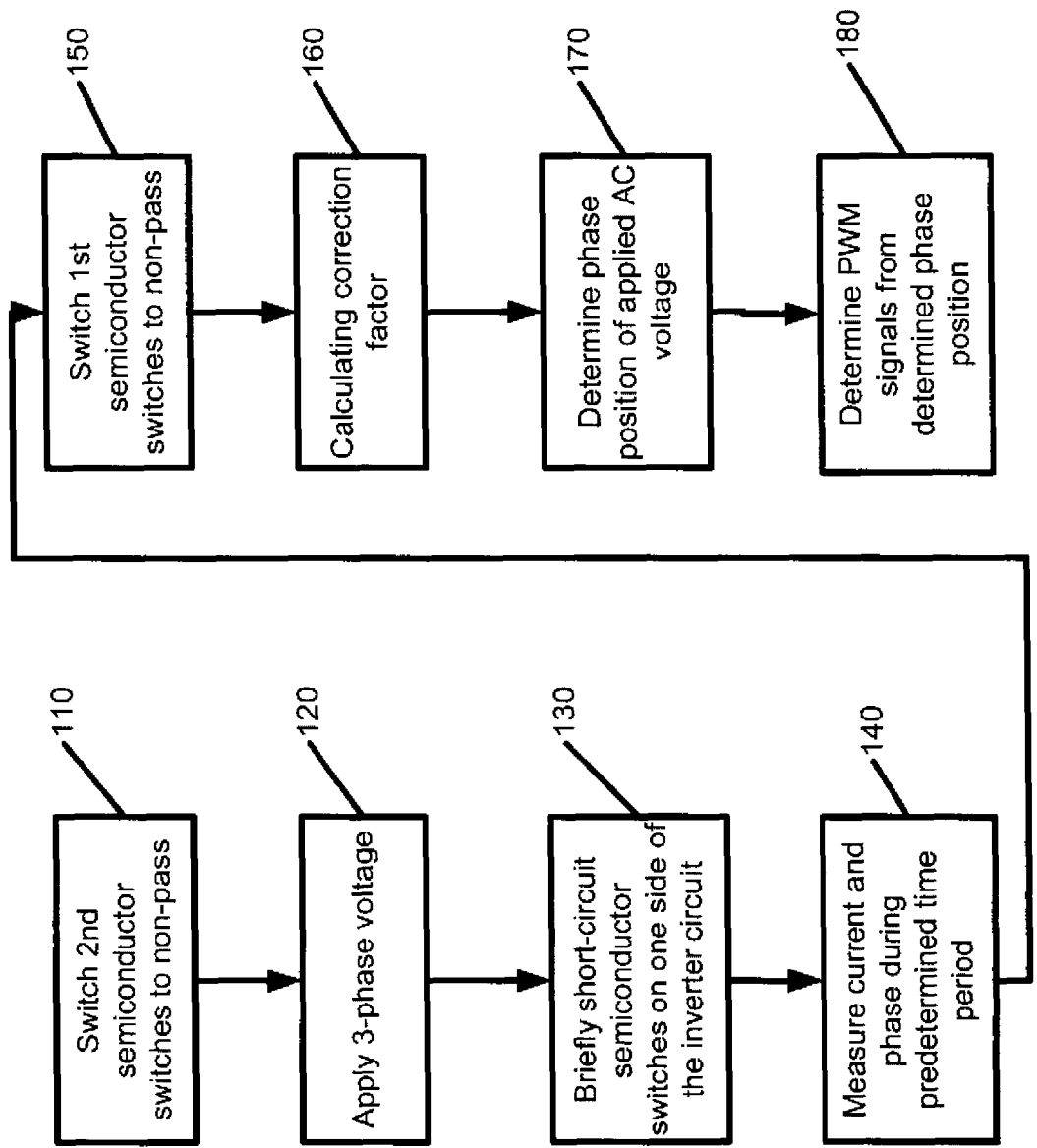
FIG. 3 shows a schematic flow diagram of a method according to the present invention for operating an inverter.

The method 100 for starting an inverter 11 can be carried out with the following steps (see FIG. 3):

At a first step 110, second semiconductor switches T2, T4, T6, which are connected to the second DC voltage terminal 22 of the inverter 11, are switched to non-pass.

At a second step 120, an at least three-phase AC voltage Ua, Ub, Uc is applied to an at least three-phase AC voltage terminal 28a, 28b, 28c of the inverter 11.

Figure 4:
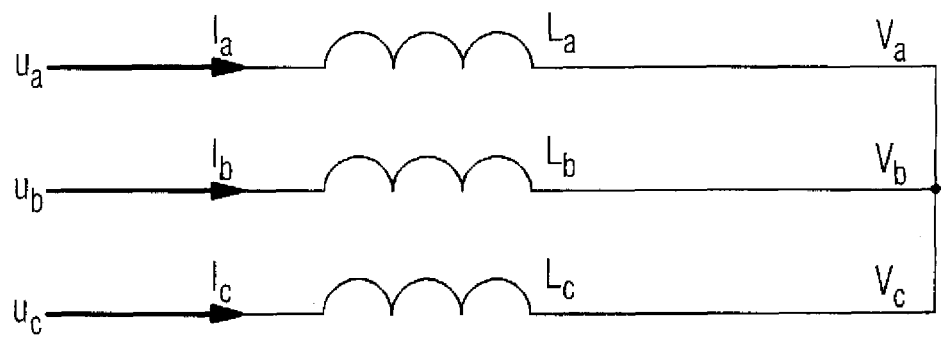
FIG. 4 shows a schematic equivalent circuit diagram during a step of the method according to the present invention.

At a third step 130, semiconductor switches of a side of the inverter circuit 10 are short-circuited during a brief time period Tp. FIG. 4 shows an equivalent circuit diagram of the inverter circuit 10 for the brief time period Tp. The semiconductor switches which are short-circuited during the brief time period can, for example, be all the semiconductor switches T1, T3, T5 which are connected to the positive connection line 21, or all the semiconductor switches T2, T4, T6, which are connected to the negative connection line 22. A small pulse 61 is sufficient to obtain sufficiently precise measured current values ia, ib for a back-calculation of the amplitude |Û| and, in particular, phase θ of the line voltages Ua, Ub, Uc.

Figure 5:
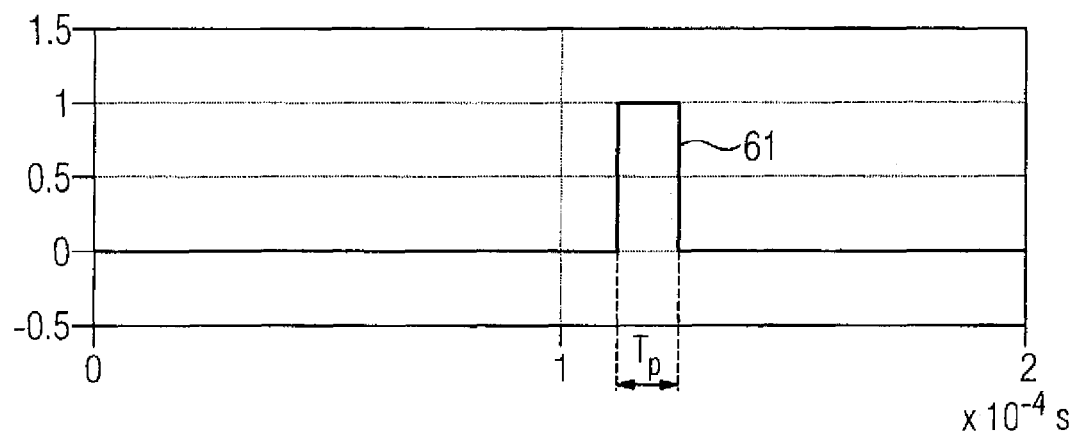
FIG. 5 shows temporal characteristics of a control voltage and of currents through phase lines on the AC voltage side of the inverter according to the present invention.
Figure 5:
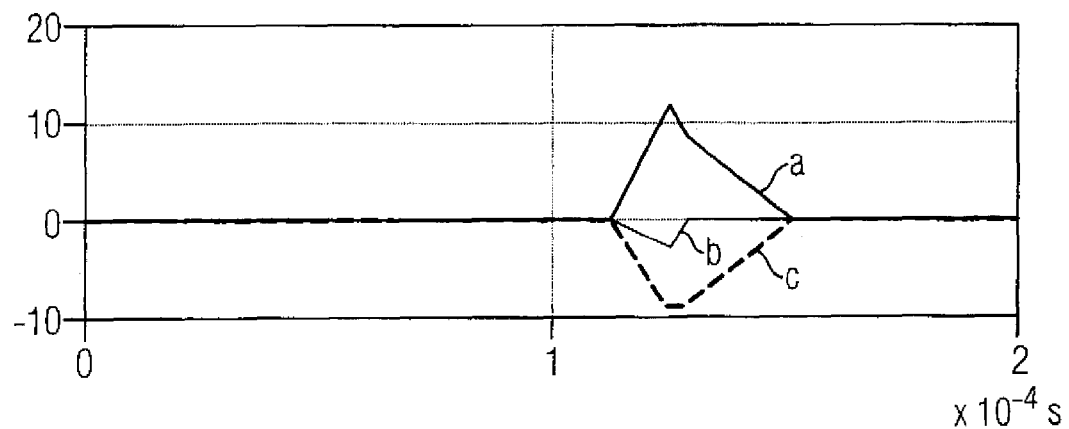

The upper part of FIG. 5 shows the time characteristic of a control voltage for the actuation of the gates G1, G3, G5 of the transistors T1, T3, T5 (as an alternative, only the gates G2, G4, G6 of the transistors T2, T4, T6 may be actuated). In the example, a pulse of 12 µs is applied to the gates G1, G3, G5 (or G2, G4, G6 respectively) of the semiconductor switches T1, T3, T5 (or T2, T4, T6 respectively).

At a fourth step 140, within the predetermined time period Tp, a magnitude ia, ib, ic and a phase position θ of a current Ia, Ib, Ic of the at least three-phase AC voltage terminals 28a, 28b, 28c are acquired. The lower part of FIG. 5 shows in this respect the time characteristic of the current magnitudes ia, ib, ic on the three phase lines 26a, 26b, 26c. The current magnitudes ia, ib, ic increase up to 12 A, and are therefore still within the permissible range. For the time Tp of the pulse 61, a mean current is determined.

After performing a Clark transformation, the following Cartesian vector components are derived for the voltage: uα=L*diα/dt and uβ=L*diβ/dt. uα und uβ (or iα and iβ respectively) are the magnitudes of line voltages (or, respectively, magnitudes of line currents) in the Cartesian co-ordinate system (Clarke representation). The linear mean value of the current during a pulse is: $i\alpha_{mean}$=uα/L*Tp/2 und $i\beta_{mean}$=uβ/L*Tp/2, wherein Tp is the duration of the pulse.

At a fifth step 150, the first semiconductor switches T1, T3, T5 are switched to non-pass after the predetermined time period Tp.

The line voltages Ua, Ub, Uc for the period Ts are estimated as follows.

At a sixth step 160, a correction factor zα, zβ is calculated from the magnitudes ia, ib, ic of the current Ia, Ib, Ic acquired after the predetermined time period Tp, and from the magnitudes ia, ib, ic of the current Ia, Ib, Ic acquired within the predetermined time period Tp.

To do this, first the mean current values are calculated for the predetermined time period Tp (i.e. for the pass-through time period Tp):

$$Îα(n+1)=Ûα/L*Tp/2; Îβ(n+1)=Ûβ/L*Tp/2.$$

For the current error, the following correction factors are calculated:

$$zα(n+1)=Iα(n+1)−Îα(n+1);$$

$$zβ(n+1)=Iβ(n+1)−Îβ(n+1).$$

At a seventh step 170, a phase position θ of the applied AC voltage U is determined (taking into account the current magnitudes ia, ib, ic determined after the predetermined time period Tp and the correction factor zα, zβ). For correction purposes, the estimated line voltage Ûα(n) is rotated by taking into account an amplification factor K:

$$Ûα(n+1)=Ûα(n)*\cos(ω*Ts)−Ûβ(n)*\sin(ω*Ts)−K*zα;$$

$$Ûβ(n+1)=Ûβ(n)*\cos(ω*Ts)+Ûα(n)*\sin(ω*Ts)−K*zβ.$$

The amplitude Û and the phase θ of the estimated AC voltage are calculated by a transformation into polar co-ordinates. As an option, the frequency ω can be calculated by means of the derivation of the phase θ and a low-pass filter.

Figure 6:
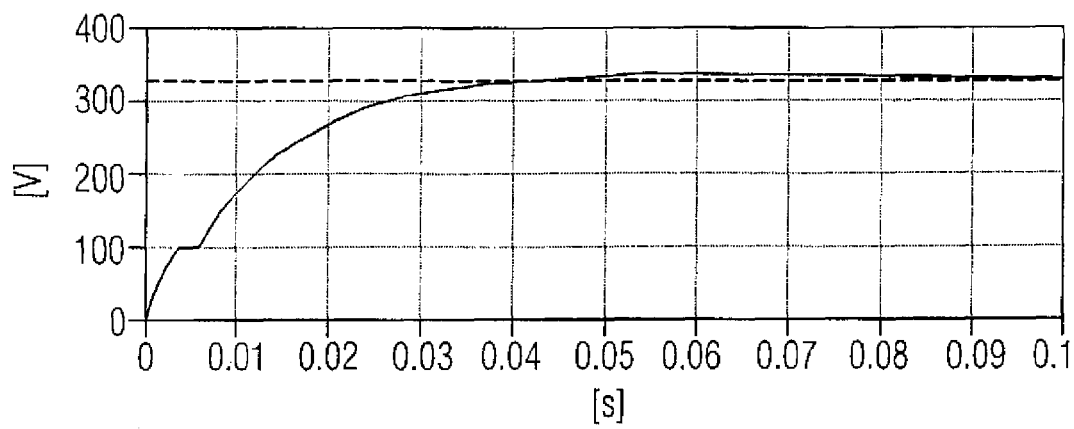
FIG. 6 shows temporal characteristics of the AC voltage, phase, and AC currents on the AC voltage side of an inverter with the soft-start function according to the present invention.
Figure 6:
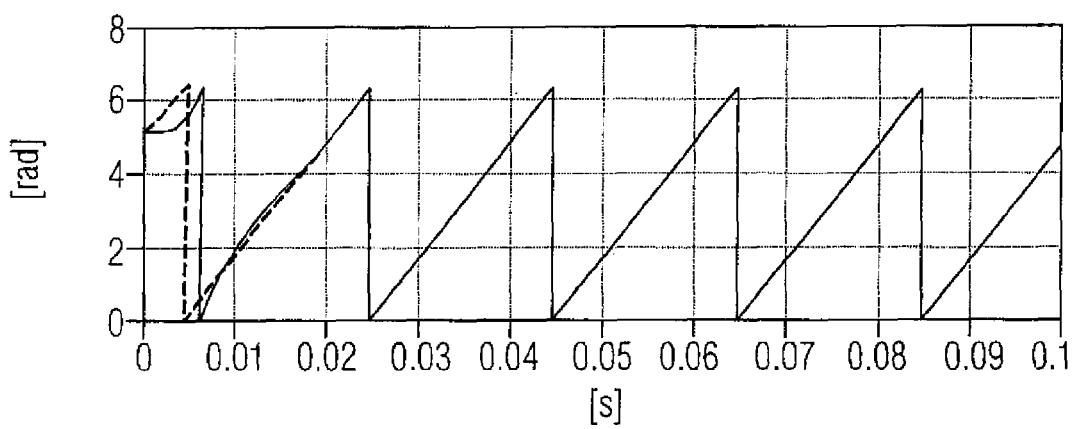
Figure 6:
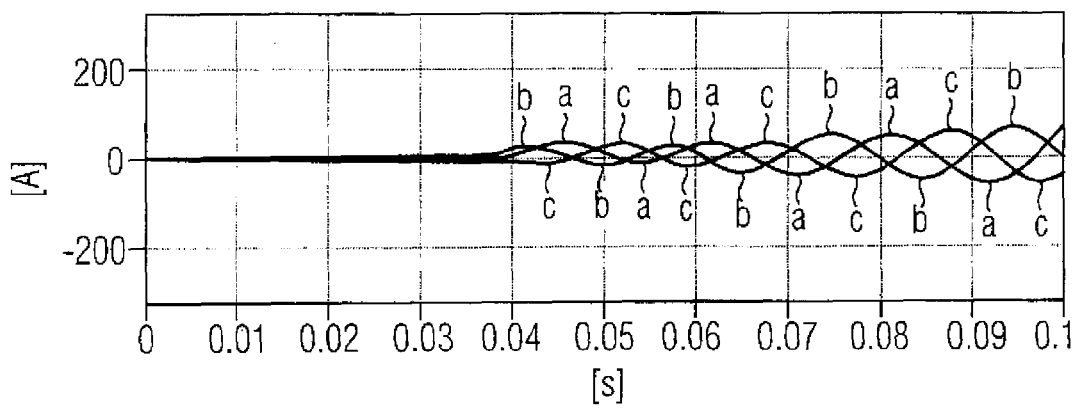
Figure 7:
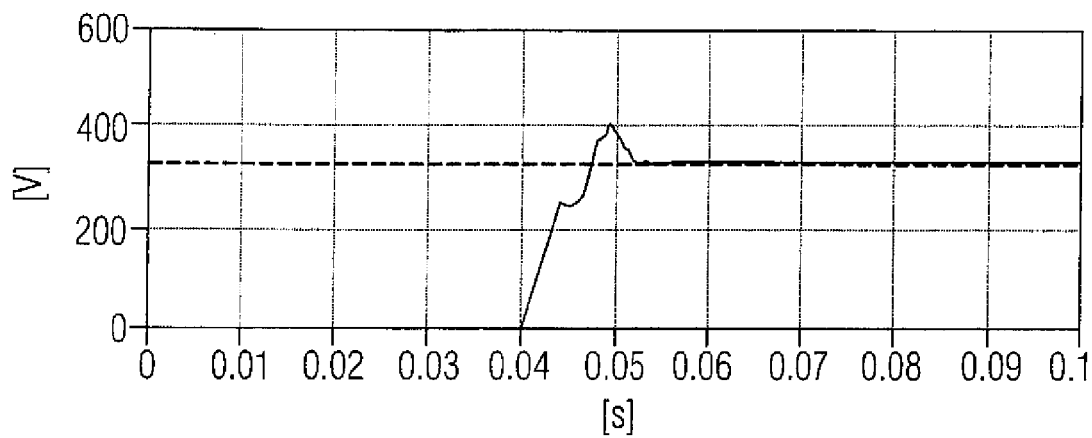
FIG. 7 shows temporal characteristics of the AC voltage, phase, and AC currents on the AC voltage side of a conventional inverter lacking a soft-start function.
Figure 7:
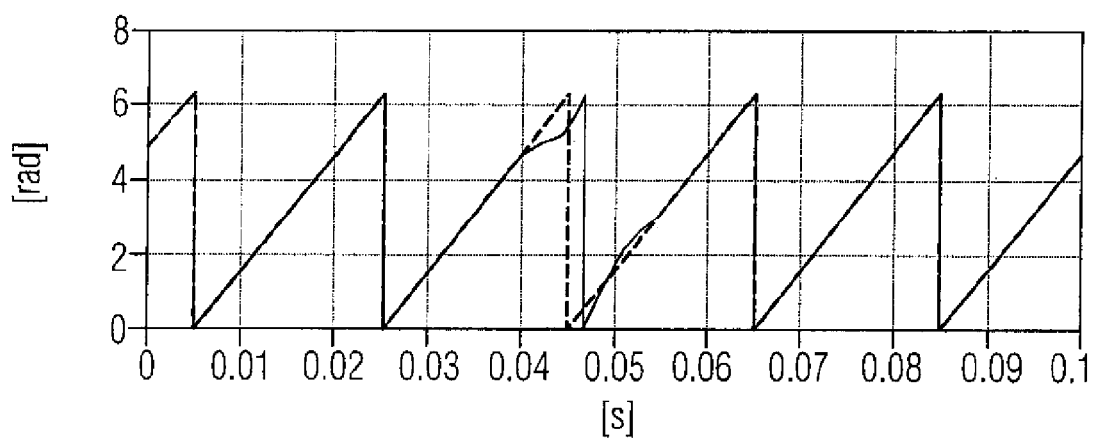
Figure 7:
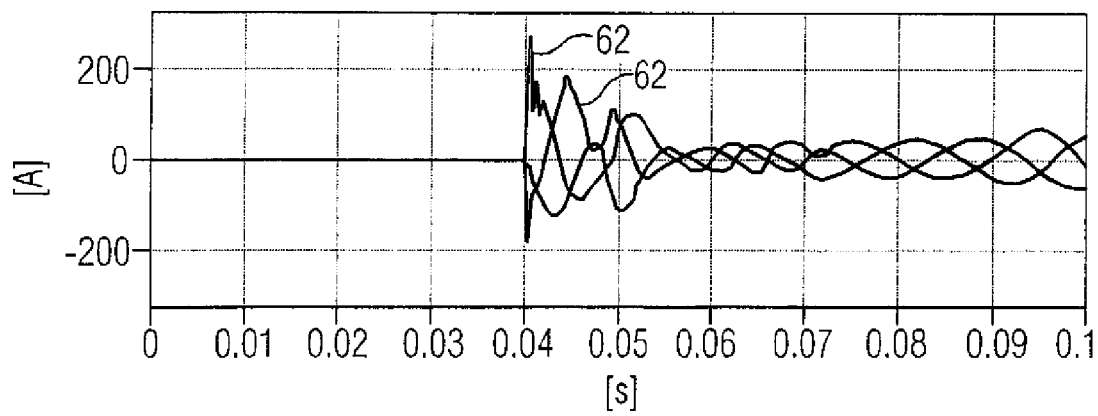

At an eighth step 180, the determined phase position θ is used as a start value for a calculation of pulse width modulation signals Sa, Sb, Sc of the inverter 11. Since the amplitude |Û| and in particular the phase θ of the voltage Û have been determined, the space vector controller 12 without voltage sensors can start up with valid start vectors (frequency ω, phase θ and amplitudes |Ûa|, |Ûb|, |Ûc| of the line voltages Ua, Ub, Uc). FIG. 6 and FIG. 7 show a comparison with and without soft start. As a result of the soft start, the AC voltages Ua, Ub, Uc determined for the lines 26a, 26b, 26c are precise enough to avoid current peaks 62 (see FIG. 7) during the start-up of the inverter 11.

The upper part of FIG. 6 shows for the soft start method the time characteristics of the estimated and the actual amplitudes of the AC voltage on the phase line 26a. The middle part of FIG. 6 shows the corresponding time characteristics of the estimated and the actual phase of the AC voltage on the phase line 26a. The lower part of FIG. 6 shows the corresponding time characteristics of the currents on the phase lines 26a, 26b, 26c.

The upper part of FIG. 7 shows for the start-up of an inverter 11 without the soft start method the time characteristics of the estimated and the actual amplitudes of the AC voltage Ua on the phase line 28a. The middle part of FIG. 7 shows the corresponding time characteristics of the estimated and the actual phase of the AC voltage on the phase line 26a. The lower part of FIG. 7 shows the corresponding time characteristics of the currents on the phase lines 26a, 26b, 26c.

The proposed invention makes possible the use of conventional space vector controllers 12 without voltage sensors, thereby advantageously obviating the need for voltage sensors.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A method for operating an inverter, comprising:
   switching second semiconductor switches, which are connected to a second DC voltage terminal of the inverter, into a blocking state;
   applying an at least three-phase AC voltage to an at least three-phase AC voltage terminal of the inverter;
   simultaneously switching three first semiconductor switches, which are connected to a first DC voltage terminal of the inverter, into a conducting state;
   measuring a magnitude of a current flowing across the at least three-phase AC voltage terminal during a predetermined time period;
   switching the first semiconductor switches into a blocking state after the predetermined time period;
   calculating a correction factor from a magnitude of a current measured immediately after the predetermined time period and from a magnitude of the current calculated from an estimated line voltage for the predetermined time period;
   determining a phase angle of the AC voltage to be applied, by taking into account the magnitude of the current measured immediately before or immediately after the predetermined time period and the calculated correction factor; and
   using the determined phase angle as a start value for calculating pulse-width-modulation signals of the inverter.

2. The method of claim 1, where the correction factor is two-dimensional.

3. The method of claim 1, wherein the magnitude of the current is measured for at least two phases when measuring the magnitude of the current flowing across the at least three-phase AC voltage terminal.

4. The method of claim 1, wherein the pulse-width-modulation signals are calculated by using a space vector for a stator of a virtual motor connected on an AC voltage side of the inverter.

5. The method of claim 1, wherein the pulse-width-modulation signals are calculated by using a space vector for a rotor of a virtual motor connected on an AC voltage side of the inverter.

6. The method of claim 1, further comprising calculating an amplitude of the AC voltage to be applied by taking into account the magnitude of the current measured after the predetermined time period and the calculated correction factor.

7. The method of claim 1, further comprising calculating a frequency of the AC voltage to be applied by taking into account the magnitude of the current measured after the predetermined time period and the calculated correction factor.

* * * * *